(12) United States Patent
Kitayama et al.

(10) Patent No.: US 6,503,987 B1
(45) Date of Patent: Jan. 7, 2003

(54) METHACRYLIC RESIN MODIFIER COMPOSITION LESS DEPENDENT ON PROCESSING CONDITIONS

(75) Inventors: Fuminobu Kitayama, Kobe (JP); Takahiko Sugaya, Kobe (JP); Norio Nagata, Kakogawa (JP); Akira Takaki, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/719,965

(22) PCT Filed: Apr. 14, 2000

(86) PCT No.: PCT/JP00/02434

§ 371 (c)(1),
(2), (4) Date: Feb. 13, 2001

(87) PCT Pub. No.: WO00/63289

PCT Pub. Date: Oct. 26, 2000

(30) Foreign Application Priority Data

Apr. 20, 1999 (JP) ............................................. 11-112879

(51) Int. Cl.$^7$ ........................... C08L 33/12; C08K 3/36; C08K 5/49
(52) U.S. Cl. ..................... 525/222; 525/232; 525/241
(58) Field of Search .................................. 525/222, 232, 525/241

(56) References Cited

U.S. PATENT DOCUMENTS

| 4,539,375 A | * | 9/1985 | Dunkelberger | ............... 525/260 |
| 5,726,245 A | | 3/1998 | Numrich et al. | |

FOREIGN PATENT DOCUMENTS

| JP | 62-1747 | 1/1987 |
| JP | 6-49312 | 2/1994 |
| JP | 7-324158 | 12/1995 |
| JP | 10-259286 | 9/1998 |
| JP | 10-259287 | 9/1998 |
| JP | 11-158344 | 6/1999 |

\* cited by examiner

*Primary Examiner*—Nathan M. Nutter
(74) *Attorney, Agent, or Firm*—Armstrong, Westerman & Hattori, LLP

(57) ABSTRACT

There is provided a modifier composition for a methacrylate resin, which can stably give a molded article excellent in strength without deteriorating transparency, color tone and appearance thereof under a wide range of injection molding conditions. A modifier composition for a methacrylate resin of the present invention comprises an impact modifier, a polymer processing aid and a reducing compound, wherein an amount of the impact modifier to the polymer processing aid is 95/5 to 80/20 in weight, and an amount of the reducing compound is 0.25 to 1.25 parts by weight based on 100 parts by weight of the total amount of the impact modifier and the polymer processing aid.

3 Claims, No Drawings

METHACRYLIC RESIN MODIFIER COMPOSITION LESS DEPENDENT ON PROCESSING CONDITIONS

TECHNICAL FIELD

The present invention relates to a modifier composition for methacrylate resin, which is used for a thermoplastic resin particularly for a methacrylate resin and can stably give an molding article having an excellent strength (impact resistance) without deteriorating transparency, color tone and appearance thereof under a wide range of injection molding conditions.

BACKGROUND ART

A methacrylate resin has been used in lighting devices and outdoor article due to its high transparency and good weatherability. On the other hand, its strength is not necessarily sufficient, and thus various kinds of impact modifiers have been attempted to be added thereto. For example, Japanese Examined Patent Publication Nos. 55-27576 (1980) and 62-230841 (1987) disclosed modifying technique relating thereto. It is necessary not to lose transparency, color tone and appearance of a methacrylate resin under a wide range of processing conditions. However, when the techniques previously disclosed are used in processing a methacrylate resin, it is difficult to satisfy the requirement that a methacrylate resin excellent in strength is stably obtained without deteriorating transparency, color tone and appearance thereof under a wide range of processing conditions. In fact, a transparent molded articles can be obtained under limited processing conditions, and an appearance thereof becomes worse due to agglomeration of the impact modifier during processing. Namely, if a molding temperature is raised in order to obtain a molded article having high transparency, the article is thermally deteriorated, color tone thereof becomes lower, and a resin gets yellowish under a slight fluctuation in processing conditions. On the other hand, if the injection molding temperature is set low, appearance of the article becomes worse so that transparency thereof is deteriorated significantly.

As a measure for these problems, some investigations have been carried out in order to stably obtain a molded article having high physical properties. For example, there are disclosed a method for using a methacrylate resin having a broad distribution of molecular weight to improve fluidity and the balance between strength and fluidity (Japanese Examined Patent Publication No. 1-29218 (1989)), and a technique for mixing an impact modifier with a dispersing agent in the state of latex to prevent agglomeration of the impact modifier as a means for reducing the so-called fish eye on the surface of an injection molding (Japanese Examined Patent Publication No. 2-2358 (1990)). However, these were not sufficient from the viewpoint that a molded article having excellent strength is obtained without deteriorating transparency, color tone and appearance thereof under a wide range of injection molding conditions in the present invention.

In the present invention there is provided a modifier composition for a methacrylate resin, which can stably give a molded article excellent in strength without deteriorating transparency, color tone and appearance thereof under a wide range of injection molding conditions.

DISCLOSURE OF INVENTION

In view of these circumstances, the present inventors extensively studied a resin composition having an excellent strength without deteriorating characteristics of a methacrylate resin, namely, transparency, color tone and appearance under a wide range of injection molding conditions. As a result, it was found out that the above problems in injection molding can be solved by blending an impact modifier, a polymer processing aid and a reducing compound with a methacrylate resin to complete the present invention.

Namely, the present invention relates to (1) a modifier composition for a methacrylate resin comprising an impact modifier, a polymer processing aid and a reducing compound, wherein a ratio of the impact modifier to the polymer processing aid is 95/5 to 80/20 in weight, and an amount of the reducing compound is 0.25 to 1.25 parts by weight based on 100 parts by weight of the total amount of the impact modifier and the processing aid, (2) the modifier composition for a methacrylate resin of the above (1), wherein the impact modifier is obtained by polymerizing a monomer mixture comprising (meth)acrylate and an aromatic vinyl monomer in the presence of an acrylic rubber and/or a conjugated diene rubber, (3) the modifier composition for a methacrylate resin of the above (1) or (2), wherein the polymer processing aid comprising 50 to 70% by weight of methyl methacrylate and 30 to 50% by weight of the other monomer copolymerizable therewith, (4) the modifier composition for a methacrylate resin of the above (1), (2) or (3), wherein a specific viscosity of the polymer processing aid is 2.5 to 5.0 regarding to 0.4% by weight of a toluene solution at 30° C., (5) the modifier composition for a methacrylate resin of the above (1), (2), (3) or (4), wherein the reducing compound is a compound containing sulfur and/or phosphorus, and (6) the modifier composition for a methacrylate resin of the above (5), wherein the reducing compound is an organic reducing compound.

BEST MODE FOR CARRYING OUT THE INVENTION

In the present invention there is no particular limitation for a methacrylate resin, it includes a resin containing at least 50% by weight of methacrylate unit, preferably at least 50% by weight of methyl methacrylate unit, and any commercially available methyl methacrylate resins can be used.

There is no particular limitation for an impact modifier used in the present invention, as long as it can be used in a methacrylate resin. In particular, the modifier is preferable which is prepared by polymerizing a monomer mixture comprising (meth)acrylate and an aromatic vinyl monomer, to which another copolymerizable monomer may be added depending on the object, in the presence of an acrylic rubber and/or a conjugated diene rubber. Since these are well-compatible with a methacrylate resin to significantly improve impact strength thereof As these modifiers, there are known those having various kinds of multilayer structure, and, for example, those disclosed in Japanese Examined Patent Publication No. 55-27576 (1980) can also be used. Further, the polymerization method is not particularly limited, but the known emulsion polymerization method is practically convenient. However, if only the impact modifier is added to a methacrylate resin, there arises the problem that transparency, color tone and appearance inherent in a methacrylate resin are deteriorated depending on processing conditions.

As a conjugated diene rubber, examples are those rubbers comprising diene monomers such as butadiene, isoprene and chloroprene. As an acrylic rubber, examples are alkyl acrylates having 1 to 12 carbon atoms in the alkyl group, such as ethyl acrylate, n-butyl acrylate, n-octyl acrylate and 2-ethylhexyl acrylate. Examples of an aromatic vinyl monomer are styrene, o-methylstyrene, m-methylstyrene, p-methylstyrene, α-methylstyrene and chlorostyrene. Examples of a (meth)acrylate are methyl acrylate, ethyl (meth)acrylate, propyl(meth)acrylate, butyl(meth)acrylate, hexyl(meth)acrylate, cyclohexyl(meth)acrylate, 2-ethylhexyl(meth)acrylate, octyl(meth)acrylate, isobornyl (meth)acrylate, phenyl(meth)acrylate and benzyl(meth) acrylate, and the like.

The polymer processing aid used in the present invention should have a relatively high molecular weight, and it is effective to use the modifier having a several to tens times higher molecular weight than that of a generally used methacrylate resin (weight average molecular weight is about 100,000). That is, apart from the generally conceivable technical idea in the prior art, the addition of a small amount of the polymer processing aid reduces the dependence of transparency on processing conditions, although the viscosity in the system rises slightly. The technical reason speculated for this is that the melting elasticity in the system becomes high to improve inferior appearance and stabilize transparency. Further, an amount of the polymer processing aid in the present invention is preferably 50 to 70% by weight of methyl methacrylate in view of compatibility with matrix. If the amount is less than 50% by weight, transparency decreases due to deviation from refractive index of matrix. If the amount of methyl methacrylate is more than 70% by weight, its compatibility with matrix is lowered due to increased rigidity of molecule in addition to relatively high molecular weight, and thereby transparency becomes low adversely. The above-mentioned methyl methacrylate is preferably copolymerized with a softening component. For example, the methyl methacrylate is preferably obtained by copolymerizing 50 to 70% by weight of methyl methacrylate with 30 to 50% by weight of the other copolymerizable monomers. The other copolymerizable monomer is preferably (meth)acrylates having one to eight carbon atoms in the alkyl group other than methyl methacrylate. If necessary, 30% by weight of the (meth)acrylates may be replaced by the other copolymerizable monomers such as styrene and acrylonitrile. Namely, (meth)acrylate monomers are preferable as the softening component without losing weatherability of the methacrylate resin. Examples of the softening component are butyl methacrylate, ethyl acrylate, butyl acrylate, octyl acrylate and 2-ethylhexyl acrylate, which are preferably used in view of costs and the like. As a matter of course, the refractive index of the polymer processing aid should be adjusted to that of a methacrylate resin as much as possible without losing transparency of the obtained molded article. In addition, the molecular weight of the polymer processing aid should be relatively high as described above. That is, its molecular weight is preferably 2.5 to 5.0 in terms of specific viscosity ($\eta_{sp}$), more preferably 2.5 to 4.0. If the molecular weight of the methacrylate resin is less than 2.5 in specific viscosity, there is no modifying effect on the object of the present invention. On the other hand, if it is more than 5.0, the compatibility with the matrix resin is deteriorated to significantly lower transparency. Here, the conditions for measuring the specific viscosity $\eta_{sp}$ are as follows: That is, the sample is dissolved at a concentration of 0.4% by weight in toluene and the viscosity $\eta_{sp}$ is obtained by using a viscometer at 30° C. according to the equation $\eta_{sp}=(\eta-\eta_0)/\eta_0$. In this equation, $\eta$ is the viscosity of the solution and $\eta_0$ is the viscosity of the solvent (toluene).

A ratio of the impact modifier to the polymer processing aid in weight is 95/5 to 80/20. If the ratio of the polymer processing aid to the impact modifier is more than 95/5, the effect improving the above-mentioned object is small. On the other hand, if the ratio is less than 80/20, the effect of improving impact resistance becomes low in spite of the amount of the impact modifier, and the transparency is also lowered. That is, it is estimated that compatibility of the polymer processing aid with a methacrylate resin as the object is lowered due to relatively high molecular weight of the polymer processing aid, thus transparency decreases adversely. As the polymer processing aid, any products commercially available can be used as long as they satisfy the conditions described above. However, if only the impact modifier and the polymer processing aid are added to a methacrylate resin, a resin having high transparency and high impact strength is obtained, and transparency thereof is improved but color tone is not improved at all.

Finally, the reducing compound in the present invention is a substance which exhibits so-called reductive actions such as peroxide decomposition, deoxygenation and hydrogenation on the subject substance of oxidization by oxidative actions such as oxidation and dehydrogenation for the substance. In particular, it is preferable to use compounds with a structure containing sulfur and/or phosphorus. Example thereof are a reducing organic compound containing phosphor such as hypophosphorous or its derivatives, phosphorous acid or its derivatives, and a reducing organic compound containing sulfur such as thiol, thioether and sulfoxide. Among these compounds having a structure containing sulfur and/or phosphorus, the reducing compound having a chemical structure containing phosphorus includes antioxidants such as the trade names of PEP-4C, PEP-8, PEP-8F, PEP-8W, PEP-11C, PEP-24G, PEP-36, HP-10, 2112, 260, 522A, 329K, 1178, 1500, C, 135A, 3010, and TPP, which are commercially available from Asahi Denka Kogyo K. K. The reducing compound having a chemical structure containing sulfur includes antioxidants such as the trade names of Irganox PS800 and Irganox PS802 FL, which are available from Chiba Geigy.

Thermal degradation at molding can be drastically improved by using the reducing compound in combination with the impact modifier and the polymer processing aid. And thereby a molding article having superior impact strength can be obtained without deteriorating transparency, color tone and appearance thereof under a wide range of injection molding conditions.

An amount of the reducing compound is 0.25 to 1.25 parts by weight based on 100 parts by weight of the total amount of the impact modifier and the polymer processing aid. If the amount is less than 0.25 part by weight, the improving effect of the stabilizer is low. On the other hand, if the amount is more than 1.25 parts by weight, color tone is contrarily deteriorated.

There is no particular limitation for a method of mixing the impact modifier, the polymer processing aid and the reducing compound. There can be used a method of mutually mixing a mixture thereof in the state of powder with a methacrylate resin, or the impact modifier, and a method of mixing the impact modifier, the polymer processing aid and the reducing compound, which are obtained by polymerization, in the state of latex, and then mixing them powdered in a usual manner (agglomeration, washing with water, filtration, drying) with the methacrylate resin to be modified. The reducing compound may also be added during the polymerization process of the impact modifier.

The modifier composition of the present invention is suitably applied to a thermoplastic resin, particularly a methacrylate resin. An amount thereof is 5 to 50 parts by weight based on 100 parts by weight of the methacrylate resin. If the amount is less than 5 parts by weight, there is no effect of improving impact strength. On the other hand, if the amount is more than 50 parts by weight, transparency decreases.

Hereinafter, the present invention is described in more detail by using examples. However, these are shown for illustrative purpose and not intended to limit the scope of the present invention.

EXAMPLE

In the Examples, the term "parts by weight" as an amount of each starting materials indicates a value based on the amount of total used monomers. Evaluation of physical properties in Example was carried out in the following manner.
(1) Haze (%) was measured at 23° C. according to JIS K 7105.
(2) A degree of yellow of a molded article was evaluated by observation with naked eyes the molded sample on a white board. The degree of yellow was classified into three levels: low, middle and high in the order of an increasing the degree of yellow.
(3) Surface appearance of a molded article was evaluated as follow.
○ . . . There is no appearance deficiency.
X . . . Appearance is deficient.

Example 1

Preparation of Impact Modifier
(a) Polymerization of a Cross-linked Methacrylate Polymer (innermost layer)

A glass reactor was chaged with a mixture having the composition shown below. After a temperature thereof was raised to 80° C. with stirring under nitrogen stream, ¼ portion of a mixture of the innermost layer components consisting of 25 parts by weight of methyl methacrylate and 0.1 part by weight of allyl methacrylate was added thereto to polymerize them for 45 minutes.

| (component) | (parts by weight) |
|---|---|
| deionized water | 220 |
| boric acid | 0.3 |
| sodium carbonate | 0.003 |
| sodium N-lauroylsarcosinate | 0.09 |
| sodium formaldehyde sulfoxylate | 0.09 |
| sodium ethylenediaminetetraacetic acid | 0.006 |
| ferrous sulfate heptahydrate | 0.002 |

The remaining ¾ portion of the above mixture was then added continuously thereto over 1 hour. After addition, the mixture was kept at the same temperature for 2 hours to complete the polymerization. Meanwhile, 0.2 part by weight of sodium N-lauroyl sarcosinate was additionally added thereto. An average diameter of polymer particles in the resulting innermost crosslinked methacrylate polymer latex was 1600 Å (as determined by light scattering at a wavelength of 546 nm), and polymerization conversion ((amount of formed polymer/amount of charged monomers)×100(%)) was 98%.
(b) Polymerization of a Rubber Polymer The crosslinked methacrylate polymer latex obtained in the above (a) was kept at 80° C. under nitrogen stream. After 0.1 part by weight of potassium persulfate was added thereto, a monomer mixture consisting of 41 parts by weight of n-butyl acrylate, 9 parts by weight of styrene and 1 part by weight of allyl methacrylate was continuously added thereto over 5 hours. Meanwhile, 0.1 part by weight of potassium oleate was added in 3 divided portions. After addition of the monomer mixture, 0.05 part by weight of potassium persulfate was further added thereto and the reaction solution was kept for 2 hours to complete the polymerization. The average particle diameter of the obtained polymer was 2300 Å, and polymerization conversion was 99%.
(c) Polymerization of Outermost Layer The rubber polymer latex obtained in the above (b) was kept at 80° C. After 0.02 part by weight of potassium persulfate was added thereto, a mixture comprising 24 parts by weight of methyl methacrylate, 1 part by weight of n-butyl acrylate and 0.1 part by weight of t-dodecyl mercaptan was added continuously thereto over 1 hour. After addition of the monomer mixture, the mixture was kept for one hour to give a graft copolymer latex having multilayer structure. An average particle diameter of the graft copolymer having multilayer structure was 2530 Å, polymerization conversion was 99%. The obtained graft copolymer latex having multilayer structure was subjected in a usual manner to coagulation by salting-out, thermal treatment and drying to obtain a white powdery graft copolymer having multilayer structure (impact modifier).
Preparation of Polymer Processing Aid A reactor equipped with a stirrer was chaged with 200 parts by weight of deionized water, 1 part by weight of sodium dioctyl sulfosuccinate and 0.03 part by weight of potassium persulfate. After oxygen was removed from the atmosphere and the solution in the reaction by passing nitrogen, a content thereof was heated to 65° C. with stirring. A monomer mixture (mixture A) comprising 60 parts by weight of methyl methacrylate, 15 parts by weight of butyl methacrylate and 15 parts by weight of butyl acrylate was added thereto over 4 hours and then heated for 1 hour with stirring to complete the polymerization substantially. Thereafter, a monomer mixture (mixture B) comprising 5 parts by weight of butyl acrylate and 5 parts by weight of methyl methacrylate was added thereto over 1 hour, and the content was kept at 65° C. for 1.5 hours and stood at a room temperature over night. Polymerization conversion was 99.2%. Further, an average diameter of polymer particles in emulsion-polymerized latex was 650 Å which was determined by the turbidity method. From this product, a powdery sample was obtained according to the method of obtaining the product having multilayer structure as described above. Specific viscosity thereof was 3.1.
Blending with a Methacrylate Resin and Preparation of a Molded Article To 100 parts by weight of a mixture comprising 37% by weight of the graft copolymer having multilayer structure, 3% by weight of the polymer processing aid and 60% by weight of a methacrylate resin (MG-102: specific viscosity= 0.122 available from ICI) was added 0.3 part by weight of a phosphorus-type antioxidant, 1178 (trinonylphenyl phosphite available from Asahi Denka Kogyo K. K.). The mixture was formed into pellets by extruding and kneading in a single-screwed extruder with vent (HW-40-28: 40 m/m, L/D=28; made by Tabata Kikai Co., Ltd.) at a temperature C3=210° C. The obtained pellets were dried at 90° C. for at least 4 hours and plaque samples having 100×150×3 (mm) for evaluation was obtained by injection-molding at a cylinder temperature C3=230 C., at a nozzle temperature N=235° C., and at a screw speed of 20 mm/sec, 50 mm/sec and 90 mm/sec in a 160MSP-10 molding machine (made by Mitsubishi Plastics Industries Ltd.). The obtained plates were evaluated to show results thereof in Table 1.

Example 2

Molded articles were prepared in the same manner as in Example 1 except that Irganox PS800 FL (dilauryl thiodipropionate available from Chiba Geigy) of a sulfur-type antioxidant was used in place of the phosphorus-type antioxidant 1178. The results are shown in Table 1.

Comparative Example 1

Molded articles for evaluation were obtained in the same manner as in Example 1 except that the polymer processing aid and the reducing compound were not used. The results are shown in Table 1.

Comparative Example 2

Molded articles for evaluation were obtained in the same manner as in Example 1 except that the reducing compound were not used. The results are shown in Table 1.

Comparative Example 3

Molded articles for evaluation were obtained in the same manner as in Example 1 except that the polymer processing aid was not used. The results are shown in Table 1.

Comparative Example 4

Molded articles for evaluation were obtained in the same manner as in Example 1 except that an amount of the stabilizer (1178 supra) was 0.1 part by weight. The results are shown in Table 1.

Comparative Example 5

Molded articles for evaluation were obtained in the same manner as in Example 1 except that an amount of the stabilizer (1178 supra) was 1.5 parts by weight. The results are shown in Table 1.

TABLE 1

| Example No. | Haze (%) | Degree of Yellow | Surface appearance |
|---|---|---|---|
| Ex. 1 | 1.7 | low | ○ |
| Ex. 2 | 1.8 | low | ○ |
| Com. Ex. 1 | 2.8 | high | X |
| Com. Ex. 2 | 1.9 | high | ○ |

TABLE 1-continued

| Example No. | Haze (%) | Degree of Yellow | Surface appearance |
|---|---|---|---|
| Com. Ex. 3 | 2.8 | low | X |
| Com. Ex. 4 | 1.9 | middle | ○ |
| Com. Ex. 5 | 1.9 | middle | ○ |

INDUSTRIAL APPLICABILITY

By blending the modifier composition of the present invention with a methacrylate resin, a molded article having superior strength can be stably prepared without deterioration in transparency, color tone and appearance thereof under a wide range of injection molding conditions.

What is claimed is:

1. A modifier composition for a methacrylate resin comprising a first compound, a second compound and a third compound, wherein
the first compound is prepared by polymerizing a monomer mixture comprising (meth)acrylate and an aromatic vinyl monomer in the presence of at least one of acrylic rubber and a conjugated diene rubber;
the second compound comprises 50 to 70% by weight of methyl methacrylate and 30 to 50% by weight of other copolymerizable monomers; and
the third compound is a compound containing at least one of sulfur and phosphorus; and further wherein an amount of the first compound to the second compound is 95/5 to 80/20 in weight, and an amount of the third compound is 0.25 to 1.25 parts by weight based on 100 parts by weight of the total amount of the first compound and the second compound combined.

2. The modifier composition for a methacrylate resin of claim 1, wherein a specific viscosity of the second compound is 2.5 to 5.0 regarding to 0.4% by weight of a toluene solution at 30° C.

3. The modifier composition for a methacrylate resin of claim 1, wherein the third compound is a reducing organic compound.

* * * * *